United States Patent Office 3,392,695
Patented July 16, 1968

3,392,695
DEEP TOWING METHOD AND APPARATUS
Norman W. Lord, Yonkers, N.Y., assignor, by mesne assignments, to the United States of America as represented by the Secretary of the Navy
Filed Dec. 16, 1966, Ser. No. 602,414
11 Claims. (Cl. 114—235)

ABSTRACT OF THE DISCLOSURE

This invention consists primarily of two parallel tubes which are forced by vanes and a rigidly suspended weight to automatically tow through deep water along a path that is parallel to their axes. A shaped weight mounted on a rigid strut below the centroid provides a restorative couple that keeps the tubes horizontal. A vertical vane well behind the centroid constrains the tubes to align with the towing direction. A small nearly horizontal vane can be adjusted so that even over a speed range of several knots the unit does not tilt downward or upward but keeps the tube axes in the horizontal plane.

---

The invention described herein may be manufactured and used by or for the Government of the United States of America for governmental purposes without the payment of any royalties thereon or therefor.

This invention relates to towed devices and more particularly to a towed device capable of achieving substantially fixed orientation at great depths.

Undersea exploration is expected to advance rapidly as the oceans receive greater recognition as a future source of food, fuel, etc. These enormous bodies of water also serve both as a protective barrier between continents and nations and a medium from which attacks may be launched against virtually any country in the world. With the Earth's water environment thus assuming an even more important role in our existence, it is necessary that our knowledge of it be enlarged as rapidly as possible.

At least two areas where our knowledge of surrounding seas, as well as of inland waters, is susceptible to considerable expansion are those of acoustics and oceanographic measurements. In most underwater acoustic and oceanographic measurements there is an uncomfortable area of ignorance concerning the stability and precise location of instruments deeply suspended below a supporting ship or station. It is virtually impossible to simulate in a remote deep sea environment the ideal laboratory frame of reference with fixed and known positions. However, when it is recognized that the deep sea is perpetually in motion with respect to the earth, it is apparent that knowledge of absolute placement of deeply suspended instruments would rarely be required for measurements other than seismological. In fact, more would be known about the physical situation if a known movement were imposed that was much larger than unknown and variable sea motion. It is thus further apparent that if rectilinear or substantially rectilinear movement can be achieved then observational variations recorded by deep instruments can be accounted for and related to the precise influences of the sea. Such rectilinear movement when coupled with precise radio navigation such as is provided by Loran C would render movement of deeply suspended instruments as nearly truly rectilinear as possible.

Rectilinear movement may be applied to position and transport a wide variety of simple sensors such as hydrophones, thermistors, salinity meters and water current meters which would record parameters along a geodesic arc. More active elements such as sound sources and sound velocimeters also could be moved through the deep sea environment acquiring information having a degree of accuracy not hitherto attainable since existing towed devices are subject to considerable lateral as well as vertical displacement even when suspended from a ship not underway.

The conventional and most direct approach to deep rectilinear motion is to tow a large mass whose inertia hopefull opposes any short-term accelerative forces which may be exerted by the heaving of the towing ship or deep water movement. While prior attempts using masses greater than 500 lbs. have been partially successful, the excessive drag, bulk, lateral and vertical excursions, danger to personnel and limited conditions under which such a weight can be used have influenced the conception and development of this invention.

The present invention provides a novel towed vehicle in which an inertial mass of moderate weight is coupled with stabilizing vanes and semi-enclosed bodies of water to produce a vehicle which is much more rigidly constrained in its own orientation than are conventional towed vehicles. The mass, which is hydrodynamically shaped, is mounted below the centroid of the composite structure to provide a restorative couple for maintaining a horizontal or substantially horizontal attitude while a vertical vane at the rear of the structure constrains it into alignment with the direction of tow.

Accordingly, it is an object of this invention to provide a towed device configured to reduce perturbations in its tow path induced by heaving of the towing ship.

It is another object of this invention to provide a towed device which substantially reduces or eliminates lateral and vertical displacements induced by deep sea spacial disturbances.

A further object of this invention is to provide a towed device capable of deep rectilinear motion while transporting passive and active sensing and recording elements.

A still further object of the present invention is to provide a method of constraining towed devices by which a platform of fixed orientation is maintained for precisely locating deeply suspended as well as deeply towed instruments.

Other objects, advantages and novel features of the invention will become apparent from the following detailed description thereof when considered in conjunction with the accompanying drawings in which like numerals represent like parts throughout and wherein.

Figure 1:
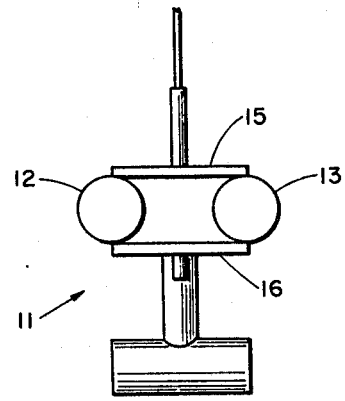
FIG. 1 is a front elevation of a deep submergence towed device constructed according to an embodiment of this invention.
Figure 2:
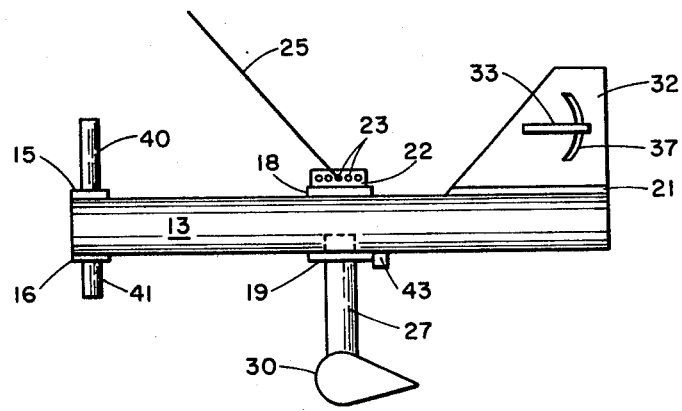
FIG. 2 is a side elevation of the device shown in FIG. 1.
Figure 3:
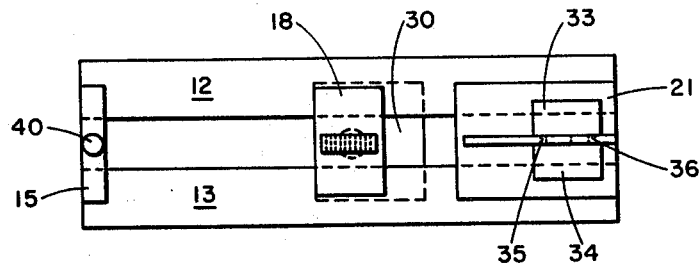
FIG. 3 is a plan view of the device shown in FIGS. 1 and 2.

Referring to FIGS. 1, 2 and 3, the numeral 11 designates generally a composite structure which is formed of a pair of parallel side tubular members 12 and 13 preferably of uniform diameter and open at both ends to permit passage of water therethrough. Each tubular member is secured at its front end to a pair of upper and lower crossbars 15 and 16, respectively, and in its intermediate portion to a pair of upper and lower plates 18 and 19, respectively. The rear portions of the tubular members 12 and 13 are joined by a stabilizer support plate 21 which preferably is secured to the upper surfaces of the tubular members.

Attached to upper plate 18 is a towing bracket 22 which has a plurality of openings 23 for selectively receiving a tow line such as towing cable 25. Alternatively, the openings 23 may receive such fittings as a shackle, not shown, to which the end of the tow line may be connected. Lower plate 19 has a central opening, not shown, through which a strut 27 is passed and thereafter secured to the plate by any suitable means, not shown. Strut 27 provides support for a hydrodynamically configured weight 30 which is attached at the lower end of the strut and provides a restorative couple for maintaining tubes 12 and 13 horizontal during towing. A stationary vertical vane 32 positioned well beyond the centroid of composite structure 11 constrains tubes 12 and 13 to align with the towing direction. A pair of adjustable horizontal vanes 33 and 34 are joined at their forward edges by a pivot shaft 35 which is received in a journaled opening, not shown, in vertical vane 32 and at their aft edges by a slot follower strut 36 which moves in a curved slot 37 in vertical vane 32. Horizontal vanes 33 and 34 preferably are rigidly secured together so as to operate as a unitary vane which may be set and secured at various angles to the horizontal by any suitable securing means, not shown.

Parameter measuring and detecting may be obtained as desired at various points on structure 11. In the embodiment shown, a folded sound path velocimeter 40 is mounted on upper crossbar 15 and a direct sound path velocimeter 41 is mounted on lower crossbar 16. A pressure gage 43 is centrally mounted at the aft edge of lower plate 19.

In operation, the device is lowered to the depth where measurements are to be taken at which time the tow line assumes a catenary having a curve reverse in curvature to that of an anchor line. If the tow line is secured to a stationary object no undesired motion will be imparted to the device. In addition, if the tow line is secured to a moving object such as a ship underway the ship motion although transmitted to the tow line will be damped by parallel tubes 12 and 13 and weight 30. This desired result is achieved by the combined damping action of weight 30 and the temporary entrapment in parallel tubes 12 and 13 of a water mass on the order of twice the weight of weight 30. With this combination, instantaneous tensions are provided in tow line 25 which range from substantially three times the steady tension to as low as ⅓ the steady tension upon release of the upward pull occasioned by the pitching motion of the towing ship. For nonresonating conditions, i.e. except for a resonating periodicity in the ship motion, the elasticity of the tow line damps or substantially damps the motion imparted at the surface on a cable which retains its shape. In the present embodiment, in which parallel tubes 12 and 13 are ten ft. long, the plane of the tubes is fixed by mounting deadweight 30 on rigid strut 27 at a point substantially three feet below the suspension point at opening 23. Horizontal vanes 33 and 34 which are adjustable over a speed range of several knots counter the increased upward tilt ordinarily encountered aft of the suspension point with increase in tow speed. The nonadjustable vertical vane 32 adequately provides alignment with the towing direction. It has been determined that at ½ knot or less with the adjustable vanes 33 and 34 horizontal the tubes maintain a substantially horizontal attitude. At a speed of 2 knots with the vanes unchanged the tubes turn downward, and this declination is much more marked at 3 knots. Horizontal vanes 33 and 34 correct for such declination, and it has been found desirable to set these vanes so as to provide a slight declination for a given speed of tow.

The present invention diminishes considerably the depth fluctuations encountered when using simply a dead weight. A comparison of depth records of the invention and a dead weight show that, based on a moving average, depth fluctuations were reduced from 2.0 to 1.2 meters, a 40% reduction.

The invention is simple and inexpensive to construct, requiring no elaborate hydrodynamic design such as is incorporated into a conventional fish type device. Although two tubes are included in the disclosed embodiment, it is possible to use a single tube or as many and as large tubes as can be handled with available equipment. Increasing the water mass entrapped increases the depth stability. Also, the relatively large vertical vane may be reduced in size or may be replaced by other azimuthal orientation control means.

Obviously many modifications and variations of the present invention are possible in the light of the above teachings. It is therefore to be understood that within the scope of the appended claims the invention may be practiced otherwise than as specifically described.

What is claimed is:
1. An underwater device which when submerged provides a reference of known orientation for underwater research comprising:
   means utilizing a portion of the surrounding medium as a mass for maintaining said device at a substantially constant depth;
   inertia mass means attached below said water utilizing means for maintaining said device in a substantially constant substantially horizontal attitude;
   stabilizing means attached to said device for providing directional control of said device; and
   detecting means mounted on said device so that parameters detected at great depths may be precisely oriented;
   whereby said water utilizing means and said inertia mass means combine to provide a restorative couple countering the effect of relative motion between the water and the device.
2. The device of claim 1,
   wherein said water utilizing means form at least one passage through which water is induced to flow.
3. The device of claim 2,
   wherein said passage is linear so that said device will align itself with the local current when secured to a stationary object and with the direction of tow when secured to a moving object.
4. The device of claim 3,
   wherein said water utilizing means operates to entrap a water mass of substantially greater weight than the weight of said inertia mass means.
5. The device of claim 4,
   wherein said stabilizing means include vertical control means for control along one axis of motion and variable horizontal control means for horizontal control at varying conditions of relative motion between said device and its surrounding water.
6. An underwater device which when submerged and secured to a tow line provides a reference of known orientation comprising:
   instrument carrying means having a shaped inertia mass attached thereto for enhancing horizontal stability;
   at least a pair of means attached to said structure for entrapping moving masses of water extending in the direction of relative motion between the structure and its surrounding water;
   said inertia mass disposed below said entrapping means to provide a restorative horizontal couple countering the effect of relative motion between the water and the structure; and
   stabilizing means disposed aft of the centroid of said structure for maintaining the attitude of said structure substantially unchanged.
7. The device of claim 6,
   wherein said entrapping means is a pair of parallel tubular members whose longitudinal axes are aligned with the direction of current when the tow line is attached to a stationary object and with the direction of tow when the tow line is attached to a moving object.
8. The device of claim 7 wherein the weight of the water instantaneously entrapped in said tubular members is on the order of twice the weight of said inertia mass; said tow line secured to said instrument carrying means above the centroid of the instrument carrying means.
9. The device of claim 8,
   wherein said stabilizing means includes vertical control means for control along one axis of motion and variable horizontal control means for horizontal con- trol at varying conditions of relative motion between said device and its surrounding water.

10. The device of claim 9 and further including velocimeter instrumentation positioned at the forward end of said instrument carrying means for determining relative water velocity in an area of minimum turbulence.

11. An underwater device which when submerged provides a reference of known orientation for underwater research comprising:

means utilizing a portion of the surrounding medium as a mass for maintaining said device at a substantially constant depth;

inertia mass means attached to said water utilizing means for maintaining said device in a substantially constant, substantially horizontal attitude;

stabilizing means attached to said device for providing directional control of said device;

detecting means mounted on said device so that parameters detected at great depths may be precisely oriented;

said water utilizing means forming at least one passage through which water is induced to flow;

said passage being linear so that said device will align itself with the local current when secured to a stationary object and with the direction of tow when secured to a moving object;

said water utilizing means operating to entrap a water mass of substantially greater weight than the weight of said inertia mass means;

said stabilizing means including vertical control means for control along one axis of motion and variable horizontal control means for horizontal control at varying conditions of relative motion between said device and its surrounding water; and a towline attached at the central portion of said device;

said inertia mass disposed a selected distance below the centroid of said device to provide a restorative couple when the device is towed.

References Cited

UNITED STATES PATENTS

| | | | |
|---|---|---|---|
| 2,862,682 | 12/1958 | Davies. | |
| 3,228,630 | 1/1966 | Byrne et al. | |
| 1,444,150 | 2/1923 | Gadomski | 114—125 |
| 3,034,468 | 5/1962 | Aschinger | 114—235 |
| 3,144,848 | 8/1964 | Knott et al. | 114—235 |

MILTON BUCHLER, *Primary Examiner.*

TRYGVE M. BLIX, *Examiner.*